United States Patent
Ibrahim et al.

(10) Patent No.: US 6,714,156 B1
(45) Date of Patent: Mar. 30, 2004

(54) METHOD FOR CORRECTING RADAR MISALIGNMENT

(75) Inventors: Faroog A. Ibrahim, Dearborn, MI (US); Gerald L. Sielagoski, St. Clair Shores, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/302,287

(22) Filed: Nov. 22, 2002

(51) Int. Cl.$^7$ ................................................. G01S 7/40
(52) U.S. Cl. ......................... 342/174; 342/70; 342/165
(58) Field of Search ........................... 342/70, 165, 173, 342/174

(56) References Cited

U.S. PATENT DOCUMENTS

| | | | |
|---|---|---|---|
| 5,313,213 A | | 5/1994 | Neumann et al. |
| 5,929,802 A | | 7/1999 | Russell et al. |
| 5,977,906 A | | 11/1999 | Ameen et al. |
| 6,026,353 A | * | 2/2000 | Winner ........................ 342/70 |
| 6,107,956 A | | 8/2000 | Russell et al. |
| 6,289,332 B2 | | 9/2001 | Menig et al. |
| 6,335,705 B1 | * | 1/2002 | Grace et al. ................. 342/174 |
| 6,369,747 B1 | | 4/2002 | Ashihara |

FOREIGN PATENT DOCUMENTS

JP            2003-57334 A    *  2/2003   .............. G01S/7/40

OTHER PUBLICATIONS

U.S. patent application Publication No. US 2001/0012976 A1, published Aug. 9, 2001, entitled "Integrated Message Display System For A Vehicle," to Menig et al.

U.S. patent application Publication No. US 2001/0000909 A1, published Jan. 3, 2002, entitled "Control Arrangement For Adjustable Housing," to Koerber et al.

\* cited by examiner

*Primary Examiner*—Ian J. Lobo
(74) *Attorney, Agent, or Firm*—Scott M. Confer

(57) ABSTRACT

A method of identifying a radar requiring alignment and of adjusting the alignment of the radar fixed to a mounting assembly. The identification method includes the steps of determining a misalignment threshold, determining the misalignment angle of the radar, and creating an alignment notice if the misalignment angle exceeds the threshold. The mounting assembly for the adjustment method includes a housing and an adjustment mechanism coupled to the housing. The method includes the steps of determining a radar misalignment angle, consulting a mapping table having adjustment mechanism manipulations associated with each of a plurality of radar misalignment angles to identify an appropriate adjustment mechanism manipulation for the misalignment angle, and performing the adjustment mechanism manipulation identified in the mapping table for the determined radar misalignment angle.

9 Claims, 5 Drawing Sheets

FIG. 6
Mapping Table

| Antenna Misalignment Angle (in Degrees) | | Rotational Adjustment (in Degrees) | |
|---|---|---|---|
| Horizontal | Vertical | Connector 68 | Connector 70 |
| 0.1 | 0.2 | 90 | 45 |
| 0.61 | 0.41 | 180 | 270 |
| 1.02 | 0.82 | 360 | 450 |
| 1.64 | 1.23 | 540 | 720 |
|  | 3.27 | 1440 |  |

METHOD FOR CORRECTING RADAR MISALIGNMENT

BACKGROUND OF THE INVENTION

The present invention is directed to a method and apparatus for adjusting the alignment of a vehicle mounted radar.

Radar systems are used to detect objects within the radar field of view and determine distances, directions, and/or velocities. In motor vehicle applications, radar system uses include spacing, collision warning, and automatic speed control. After detecting vehicles or other objects within the radar field of view, known path prediction software may identify target vehicles in the path of the host vehicle, generate warnings to the driver, and/or suggest corrective action, such as altering the relative range and velocity of the host and target vehicles via throttle or brake control.

A basic characteristic common to these applications is that the radar system, or more precisely, its directional antenna should be properly aligned with a desired principal beam direction. In the case of a motor vehicle application, the principal beam direction is often selected to be parallel to the travel or thrust axis of the vehicle. A variety of alignment techniques may be used to align a radar's principal beam direction with the vehicle thrust axis. One such technique includes conducting bench measurements of the radar prior to installation and then further bench measurements during installation or alignment correction. By way of example, the technique illustrated in FIG. 7 first uses a radar test bench to determine the elevation and azimuth between a reference axis 102 for a mirror fixed to the radar and the radar's principal beam direction (also commonly referred to as a radar electrical axis). The elevation and azimuth angles are stored in radar memory and referred to below as a mirror offset angle. During radar installation or realignment, the position of the radar is set so that the angle between the mirror axis 102 and the vehicle thrust axis 106 equals the stored offset. As a result, the principal beam direction is aligned with the vehicle thrust axis.

More particularly, during or prior to radar mounting on the vehicle, and with the known mirror offset angle described above, the vehicle thrust axis 106 is determined, such as by measuring the median axis of the driven wheels on a dedicated bench that sets or checks wheel parallelism or alignment. An autocolimator 108, having a laser or optical device 110, is offset an angle 112 from thrust axis 106. The angle 112 is measurable by the autocolimator. The mirror reflects the beam generated by the laser device 110 and the autocolimator measures the reflection angle 114 which is bisected by the mirror axis 102. Thus, the measured reflection angle 114 is a function of the mirror angle 118 measured from the thrust axis 106. By positioning the radar such that the calculatable mirror angle 118 equals the stored mirror offset angle, the principal beam direction is aligned with the vehicle thrust axis 106.

The above technique, as well as other techniques available in the art, require expensive machines and well trained technicians for proper radar alignment. Due to the cost of the machines, radar alignment is commonly provided at vehicle manufacturing facilities rather than at retail dealerships. However, the alignment of the radar should also be readily adjustable after the radar system is installed in a vehicle mounting apparatus so as to permit correction of misalignments that may occur throughout the service life of the vehicle. Unfortunately, the complexity and cost of available alignment techniques do not adequately address this need.

Many conventional vehicle radar systems and associated software periodically calculate a misalignment value for the radar. For small magnitudes of misalignment, existing systems commonly correct the alignment through mathematical calibration techniques. However, large misalignments require intervention of the type described above by a technician at a service shop or factory.

SUMMARY OF THE INVENTION

In view of the above, the present invention is generally directed to providing an improved, simple, reliable and inexpensive method for adjusting radar misalignment. One feature of the method identifies when technician intervention is required for aligning the directional radar antenna. Further features of the invention include a mapping table that correlates mounting assembly adjustment manipulations to specific misalignment angles so that the necessary re-alignment may be efficiently identified and performed by a technician.

The method of correcting the radar misalignment at service shop is based on storing the estimated misalignment angle and displaying an alignment notice to the driven when the antenna misalignment exceeds a predetermined threshold. Further, the technician in the service shop is provided with a mapping table correlating misalignment angles to specific corrective action, e.g., an amount of clockwise or counter clockwise rotation of an adjustment mechanism on the vehicle mounting assembly. The method and apparatus of the present invention simplifies the identification and implementation of radar antenna alignment at the service shop.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description, the appended claims, and the accompanying drawings in which:

FIG. 6 shows a representative mapping table; and

DETAILED DESCRIPTION

Figure 1:
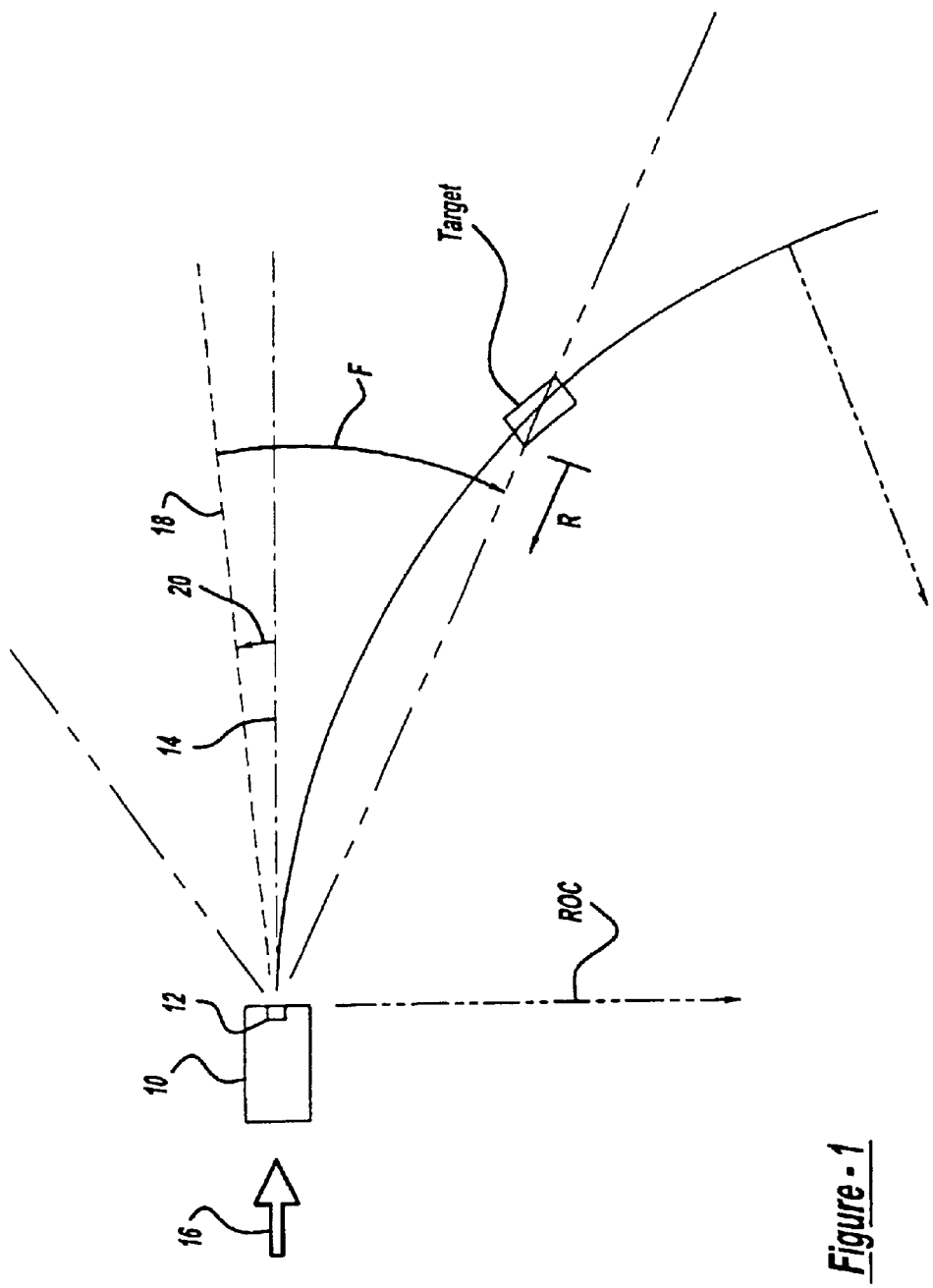
FIG. 1 is a schematic illustration of a vehicle having a radar and shows the radar beam direction, field of view, as well as vehicle path information.

FIG. 1 illustrates a vehicle 10 having a radar 12 mounted to the vehicle such as to the front bumper or grill. The radar has a principal beam direction 14 that, in most applications, is desired to be directed parallel to the vehicle axis of travel 16. During vehicle use, the radar principal beam direction may become misaligned, such that the actual beam direction 18 is offset from the desired direction 14 creating an offset angle 20. The present invention is directed to a method of identifying when the radar is in need of re-alignment and for adjusting the alignment of the radar. In general, the present invention provides numerous advantages over conventional systems, particularly in the simplicity and reduced cost by which a misaligned radar can be identified and corrected.

Figure 2:
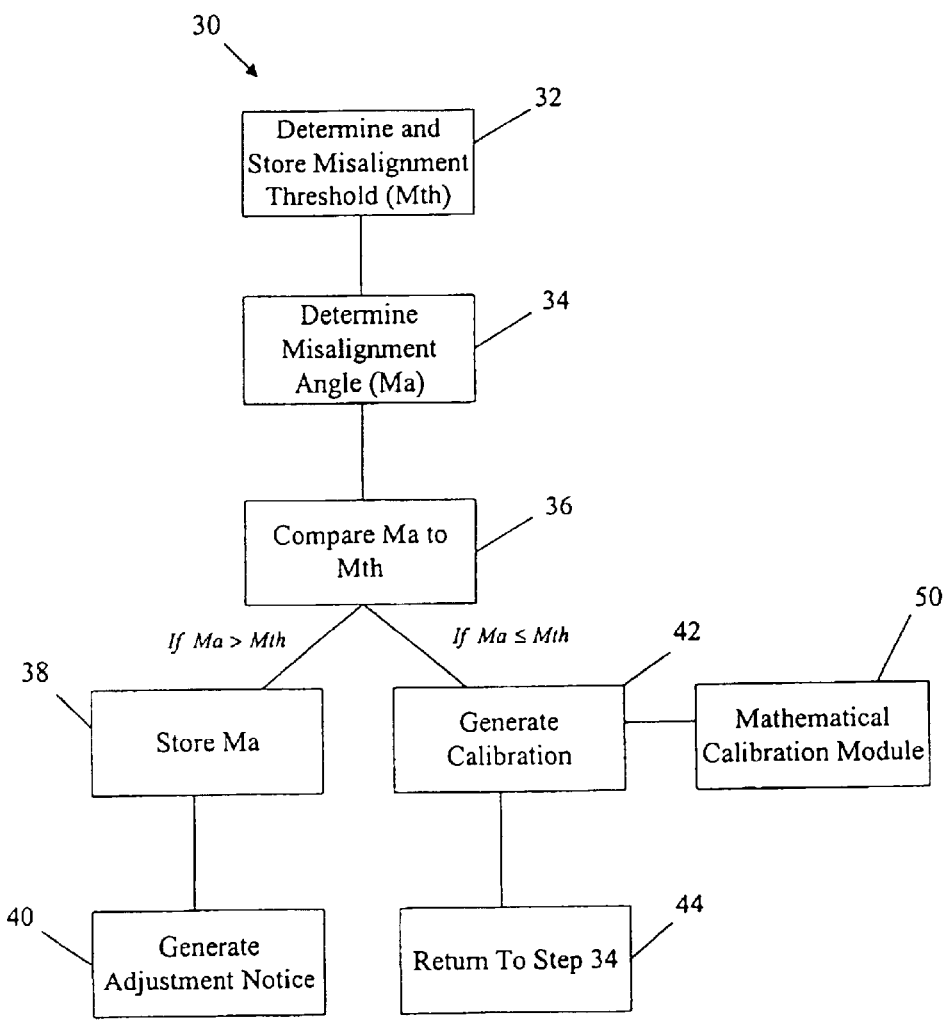
FIG. 2 is a schematic illustration of the method according to the present invention.

As is shown in FIG. 2, the alignment correction method 30 includes determining a threshold misalignment value for the radar. This step (step 32 in FIG. 2) is preferably performed prior to installation of the radar on the vehicle and does not change over the useful life of the radar. Functional considerations, as well as an equation, for calculating the misalignment threshold are discussed in detail below. However, those skilled in the art will appreciate that alternative methods for determining the misalignment threshold may be used without departing from the scope of the invention defined by the appended claims.

Figure 3:
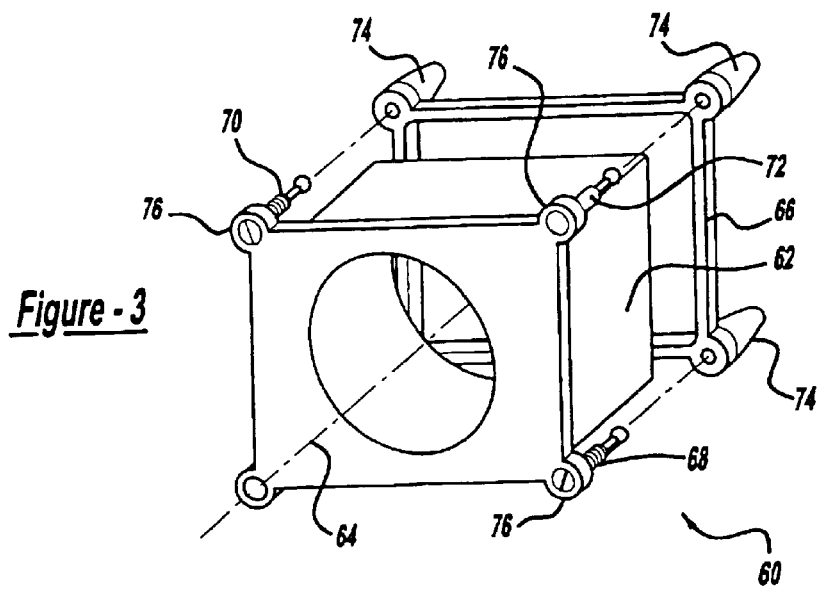
FIG. 3 is a perspective view of a radar mounting assembly according to the present invention.
Figure 4:
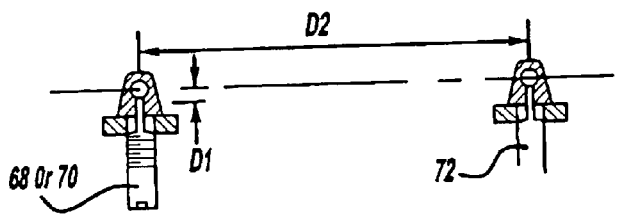
FIG. 4 illustrates the relationship of the connectors of the mounting assembly shown in FIG. 3.
Figure 5:
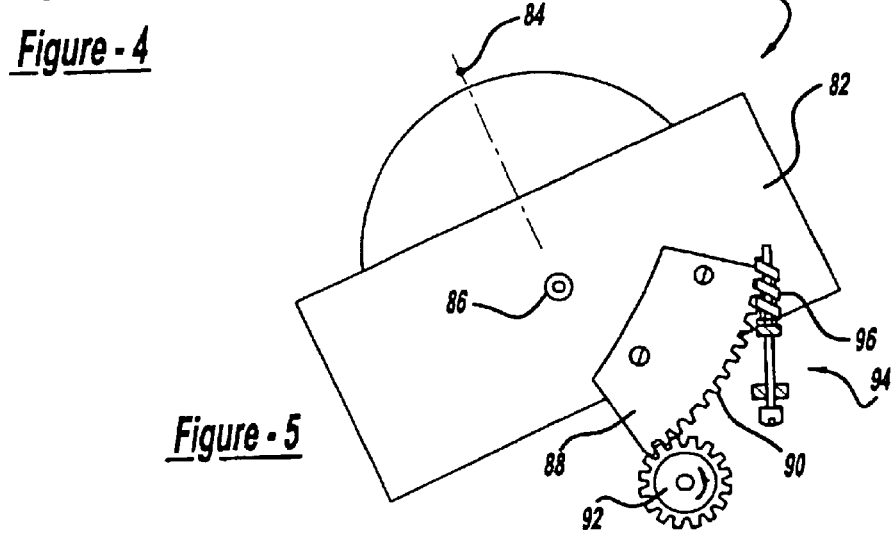
FIG. 5 illustrates an alternative radar mounting assembly according to the present invention.
Figure 7:
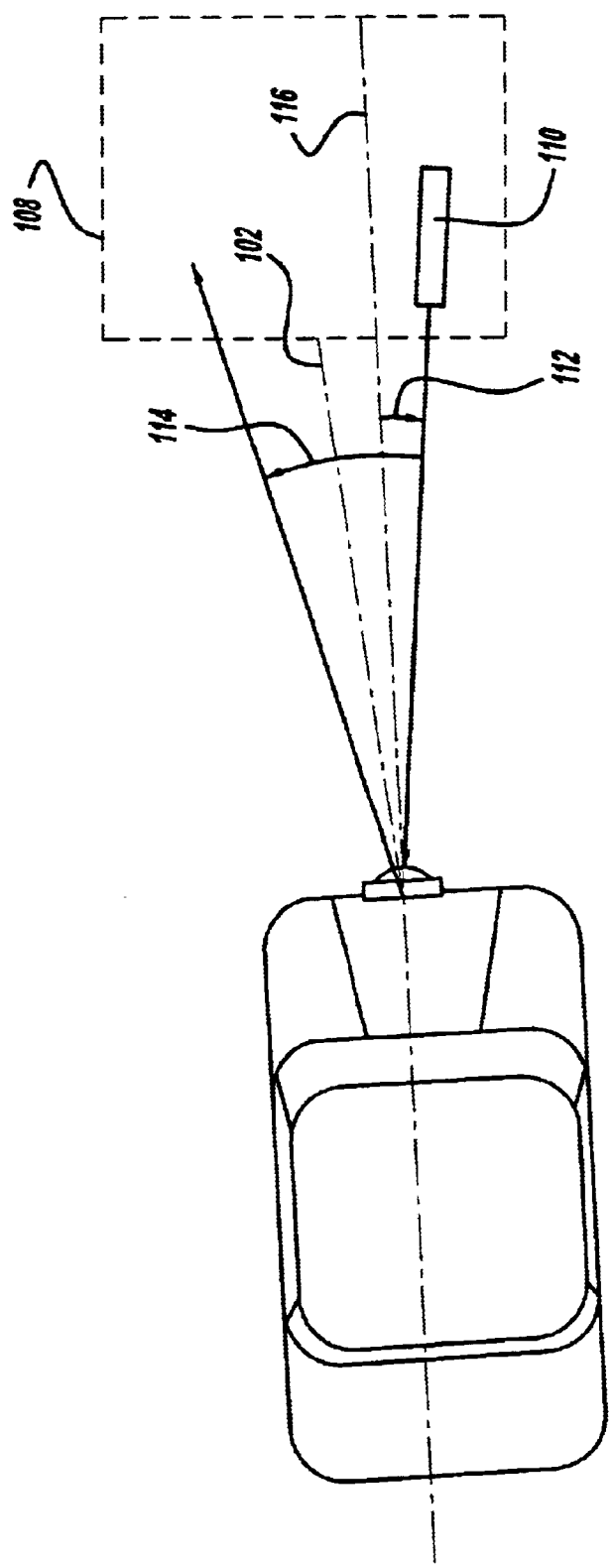
FIG. 7 illustrates a prior art radar alignment technique.

Once the misalignment threshold is determined and the radar is mounted in the vehicle, such as through the illustrative mounting assemblies shown in FIGS. 3–5 or other suitable assemblies, the alignment of the radar may be monitored by conventional alignment determination software. This software commonly periodically determines an actual misalignment angle (Ma) for the radar (step 34 in FIG. 2). In the present invention, determined misalignment angles are compared to the threshold (step 36 in FIG. 2) and, if the determined angle is greater than the threshold, the radar is deemed to be in need of re-alignment. In certain applications, the controller would then store the misalignment angle and generate an adjustment notice (steps 38 and 40 in FIG. 2) informing the driver that the radar needs to be realigned at a service shop. Conversely, if the misalignment angle is less than or equal to the threshold, the radar system is deemed to not be in need of realignment by a technician. The program may then institute any of the known mathematical or physical calibrations (step 42 in FIG. 2), such as through the use of a conventional mathematical calibration module 50, and then return to the determination of the misalignment angle at the next interval (step 44).

When the vehicle is taken to a service shop for realignment, the technician can retrieve the stored misalignment angle. The technician then references a mapping table for the radar and mount to determine the appropriate adjustment. The mapping table includes a plurality of incremental misalignment values correlated to an appropriate adjustment of the mounting assembly. Thus, the technician need only retrieve the stored misalignment angle, identify the appropriate adjustment from the mapping table, and perform the identified adjustment, such as by rotating the appropriate threaded rod or screw the amount identified in the mapping table. Thus, the present invention provides a low cost misalignment adjustment method for vehicle mounted radar systems.

The misalignment threshold as used herein refers to the radar misalignment magnitude at which the system identifies the radar as requiring realignment by a technician. The threshold may be determined in a variety of ways and is generally a function of the expected or desired performance of the radar. As noted above, many conventional radar systems of the type described herein, including those used for automatic cruise control (ACC), include calibration techniques designed to compensate for small magnitudes of radar misalignment. These techniques include mathematical adjustment of the radar readings to compensate for the misalignment angle 20. However, practical considerations dictate that for larger magnitudes of radar misalignment, these and other conventional calibration techniques do not provide observability characteristics sufficient to maintain the integrity of the system. It is in these circumstances that the present invention provides a misalignment adjustment method that can be readily performed at a service shop.

Notwithstanding the various techniques that may be used with the present invention to identify the misalignment threshold, and without limiting the scope of the present invention, the following is an illustration of a preferred method for determining the misalignment threshold. As is illustrated in FIG. 1, each radar includes a field of view +/−F (in radians) measured from the beam direction 18. The maximum expected performance at the edges of the field of view may be quantified by the range R that the radar is expected to observe a target along a predetermined radius of curvature ROC. In the described embodiment, the misalignment threshold is a function of the expected performance of the radar at edges of the field of view. Even more preferably, the misalignment threshold (MTh) may be calculated according to equation (1) below.

$$Mth = F - \left(\frac{2}{R} + \left(\frac{R}{2ROC}\right)\right) \quad (1)$$

For a further understanding of the invention, the following example assumes that the radar field of view (F) is +/− eight (8) degrees and the desired radar system performance is to observe a target at a range (R) of one hundred (100) meters along a radius of curvature (ROC) of five hundred (500) meters. The misalignment threshold for this application according to equation (1) is:

$$Mth = \frac{8*\pi}{180} - \left(\frac{2}{100} + \frac{100}{2*500}\right) = 0.0196 \text{ radians} = 1.1245 \text{ degrees}$$

It should be appreciated that the identified values for the field of view, range, and radius of curvature, while representative of desirable performance criteria for certain vehicle mounted radar applications, may be varied without departing from the scope of the invention.

In FIG. 2, step 34 represents the determination of the misalignment angle 20 of the radar antenna. Methods known in the art to determine the misalignment angle include a variety of hardware and software implemented techniques. The present invention is directed to the use of the predetermine misalignment angle and is not dependent upon a specific angle determination technique. Thus, a variety of available misalignment angle determination techniques may be used. It is noted that a conventional hardware implemented misalignment determination. technique includes that used by Autocruise, a provider of radar equipment for use in ACC and other applications.

More generally, radar sensors commonly provide data representing the azimuth angle and the range of the target. For each angle and range reading from a sensor, the location point of the target may be estimated. After a series of such readings, the trajectory line of the target may also be estimated. The angle of misalignment may then be estimated from the angle between the trajectory line and the path of travel of the host vehicle. Notwithstanding the exemplary illustrations of suitable misalignment angle estimation techniques provided above, it is again noted that a variety of other known misalignment angle determination techniques may be used with the present invention.

As indicated at step 36 in FIG. 2, the misalignment angle (Ma) determined in step 34 is compared to the misalignment threshold (MTh) determined at step 32. If the misalignment angle exceeds the threshold the misalignment angle is stored in the vehicle's on-board computer and an adjustment notice or display is provided to the driver of the vehicle indicating that the radar is in need of misalignment servicing. A variety of display techniques may be used with the present invention to provide an alignment notice to the driver identifying the need to re-align the radar antenna. By way of example rather than limitation, the display may include a warning light on the vehicle instrument panel, an audible signal, or a visual/audible combination. Further examples of display techniques particularly suitable for ACC systems include, when the ACC system is active, to (1) alternately display the ACC set speed and a text message indicating that the radar is in need of service or (2) display a suitable text message or audible signal when the driver performs a throttle or brake override of the ACC.

Once the vehicle is in the service shop, a technician can extract misalignment information from the on-board computer through any of a number of conventional techniques. By way of example, when the vehicle is stationary, the ACC controls, e.g., the SET/RESUME/ACCEL buttons, may be manipulated in a specific sequence to display the stored misalignment angle to the technician. With the misalignment angle, the technician may consult the mapping table to identify and perform the appropriate alignment correction.

Before proceeding to a detailed discussion of representative content for the mapping table of the present invention, it is noted that the table generally provides adjustments that are specific to the radar mounting assembly on the vehicle. As such, the corrective action will be dependent on the type of mounting assembly. While numerous mounting assemblies may be suitable for use with the present invention, FIGS. 3–5 illustrate two mounting assemblies particularly suited for use with the present invention. The assemblies generally include a stable housing to which the radar antenna is fixed and adjustable connectors coupling the housing to the vehicle.

FIG. 3 shows a mounting assembly 60 having a housing 62 containing the radar antenna 64. A plate 66 is fixed to the vehicle body. Adjustable connectors 68 and 70 and a fixed connector 72 couple the housing 62 to the plate 66 in a manner that permits adjustment of the horizontal and vertical orientation of the housing and antenna relative to the vehicle. The plate 66 and housing 62 include connector mounts 74 and 76, respectively, for receiving the connectors. The mounts are positioned at three points in a plane perpendicular to the principal beam direction of the antenna 64, preferably in. an L-shaped configuration with respect to one another. The adjustable connectors 68 and 70 are illustrated as threaded rods equipped at one end with a ball head to allow the threaded rod to move in the mount. The fixed connector 72 is centered between connectors 68 and 70 and also includes a ball head to facilitate controlled movement of the housing relative to the plate. By this configuration, the principal beam direction 64 of the radar system is adjustable by rotation of the two displaceable connectors 68 and 70 in two directions, preferably horizontally and vertically, located perpendicularly to each other.

By this configuration, as shown in FIG. 4, the axial displacement (D1) of the each adjustable connector is a function of the magnitude that the connector is rotated and the known pitch of the threads. Thus, with the known distance, D2, between the movable and fixed displacement connectors, the angular orientation of the radar directional antenna can be adjusted a predetermined magnitude based on the rotational displacement, D1, of the adjustable connectors 68 and 70 according to equation (2) below.

$$\text{Angular Displacement} = \arctan(D1/D2) \tag{2}$$

As noted above, the mapping table of the present invention identifies to the technician the specific action to be taken to correct misalignment angles for a particular radar and mounting assembly. A representative mapping table is illustrated in FIG. 6 for the radar mounting assembly shown in FIGS. 3 and 4. In this example, the mapping table sets forth the necessary rotational adjustments, either clockwise (CW) or counterclockwise (CCW), for the adjustable connectors 68 and 70 to correct the identified radar misalignment angles 20 retrieved by the technician from the vehicle's on-board computer. As noted in FIG. 6, it is contemplated that the mapping table may provide for both horizontal and vertical correction of the alignment of the antenna 64. To this end, FIG. 6 provides adjustments for the connectors 68 and 70 wherein, as shown in FIG. 3, the connector 68 provides vertical adjustment relative to the fixed displacement connector 72 and connector 70 provides horizontal adjustment. By way of example, connectors 68 and 70 may be ¼–20 fasteners having an axial displacement of 0.05 inches for a full 360° rotation, the distance D2 between the movable connectors 68 and 70 and the first displacement connector 72 is 3.5 inches. It should be appreciated that a mapping table similar to that shown in FIG. 6 may be provided for any suitable mounting assembly used to couple the radar to the vehicle and may be provided to the service technician in a variety of forms, such as in a service manual associated with the mounting assembly and radar combination.

An alternative mounting assembly 80 is illustrated in FIG. 5 to include a housing 82 containing the radar antenna 84. The housing is coupled to the vehicle at a mounting point 86 about which the housing may rotate. An adjustment plate 88 has teeth 90 forming an arc. The teeth 90 mesh with a motor driven gear 92 and/or manual adjustment element 94 with a worm gear 96 to control the rotational position of the housing 82, and therefore the radar antenna, relative to the vehicle. While the mounting assembly illustrated in FIG. 5 permits rotation of the housing only in a single, e.g., horizontal plane, those skilled in the art will appreciate that a second mounting point, toothed plate, and gear/adjustment element assembly may be provided to permit rotational adjustment in a second, e.g., vertical, plane. The mounting assembly 80 again permits controlled and predetermined angular adjustment of the radar antenna based upon manipulation of the gear or manual adjustment element.

As noted above, the present invention may be used with numerous alternative mounting assemblies. The assemblies of FIGS. 2–5 are provided for illustrative purposes. Those skilled in the art will appreciate that other suitable assemblies may include, for example, a variety of spring loaded rotatable element assemblies and gimbal type mounts commonly used in headlight mounting assemblies.

With the above in mind, those skilled in the art will appreciate that the present invention provides an improved, simplified, reliable, and inexpensive method for determining when technician intervention is required for aligning the directional antenna of a radar as well as to permit the technician to readily identify and perform any necessary corrections to realign the The foregoing discussion discloses and describes an exemplary embodiment of the invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of identifying a radar requiring alignment comprising the steps of:
   determining a misalignment threshold as a function of the radar field of view and maximum expected target range in a designated radius of curvature;
   determining the misalignment angle of the radar; and
   creating an alignment notice if the misalignment angle exceeds the threshold.

2. The method of claim 1 further including the step of storing the misalignment angle.

3. The method of claim 1 wherein the step of determining a misalignment threshold includes calculating the misalignment threshold (MTh) according to $$Mth = F - \left(\frac{2}{R} + \left(\frac{R}{2ROC}\right)\right)$$

wherein F is the absolute value of the radar field of view and R is the maximum expected target range in a designated radius of curvature ROC.

4. A method of adjusting the alignment of a radar fixed to a mounting assembly, the mounting assembly including a housing and an adjustment mechanism coupled to the housing, said method comprising the steps of:
   determining a radar misalignment angle;
   consulting a mapping table having adjustment mechanism manipulations associated with each of a plurality of radar misalignment angles to identify an appropriate adjustment mechanism manipulation for the misalignment angle; and
   performing the adjustment mechanism manipulation identified in the mapping table for the determined radar misalignment angle.

5. The method of claim 4 wherein the adjusting mechanism includes a rotatable element and the manipulations in the mapping table include a rotatable adjustment of said rotatable element corresponding to each of said plurality of misalignment angles, and wherein the step of performing the manipulation identified in the mapping table includes rotating the rotatable element.

6. The method of claim 4 further including the steps of:
   determining a misalignment threshold;
   comparing the misalignment angle to the misalignment threshold; and
   consulting the mapping table if the misalignment angle is greater than the misalignment threshold.

7. The method of claim 6 wherein the misalignment threshold is a function of the radar field of view and maximum expected target range in a designated radius of curvature.

8. The method of claim 7 wherein the step of determining a misalignment threshold includes calculating the misalignment threshold (MTh) according to $$Mth = F - \left(\frac{2}{R} + \left(\frac{R}{2ROC}\right)\right)$$

wherein F is the absolute value of the radar field of view and R is the maximum expected target range in a designated radius of curvature ROC.

9. The method of claim 6 further including the step of generating an alignment notice if the misalignment value exceeds the threshold.

* * * * *

UNITED STATES PATENT AND TRADEMARK OFFICE
CERTIFICATE OF CORRECTION

PATENT NO. : 6,714,156 B1
DATED : March 30, 2004
INVENTOR(S) : Faroog A. Ibrahim et al.

It is certified that error appears in the above-identified patent and that said Letters Patent is hereby corrected as shown below:

Column 6,
Line 63, after "the" insert -- antenna. --.
Line 65, after "the" (first occurrence) insert -- present --.

Signed and Sealed this

Ninth Day of November, 2004

JON W. DUDAS
*Director of the United States Patent and Trademark Office*